United States Patent Office 3,344,582
Patented Oct. 3, 1967

3,344,582
IRREVERSIBLE HYDROGEN MEMBRANE
Robert P. Merrill, Walnut Creek, Calif., and Richard P. Crowley, Milton, Mass., assignors to ABCOR, Inc., Cambridge, Mass., a corporation of Massachusetts
No Drawing. Filed Dec. 21, 1964, Ser. No. 420,118
18 Claims. (Cl. 55—16)

Our invention relates to a method and system for purifying hydrogen and for separating hydrogen from gaseous mixtures. In particular, our invention concerns an improved membrane for the diffusion of hydrogen.

Hydrogen has been separated from gaseous mixtures and has been purified to a high purity by diffusion through semi-permeable metal membranes. For example, hydrogen diffuses at a relatively rapid rate through thin films of palladium or palladium alloys at temperatures of about 100–400° C. or higher. Diffusion across the palladium film continues so long as there exists a hydrogen partial pressure gradient between the two surfaces of the film e.g. at least 10 p.s.i.g. per square inch of membrane surface. In conventional hydrogen diffusion cells for purifying hydrogen the impure hydrogen is commonly supplied at pressures of up to about 300 p.s.i.g. or higher and the pure hydrogen recovered on the opposite side of the film and from the cell at substantially atmospheric pressure. Thin unsupported sheets of palladium tend to buckle and are structurally weak, accordingly, it has been suggested that thin films be placed on and supported by a rigid material such as sintered metals or ceramics or other material porous to the hydrogen molecule (see U.S. Patent 2,958,391). Further the palladium film itself may be increased in thickness, alloying elements like 10% to 50% silver added, or the palladium formed in a particular shape such as into a plurality of capillary tubes for increased structural strength. An increase in the thickness of the palladium may substantially increase the capital cost of the diffusion membrane and decrease the rate of hydrogen permeation, particularly in commercial plants where the amount of palladium used may represent a significant cost of the diffusion cell. Additionally, all of these membranes require that a positive pressure difference be maintained at all times with the elevated pressure of the impure hydrogen or a gaseous mixture containing hydrogen on the one side of the membrane. If this pressure gradient is reversed, the hydrogen tends to diffuse back into the impure stream of gaseous mixture. For example, where the partial pressure of a process feed stream containing hydrogen varies over a wide range such as above and below atmospheric pressure, back diffusion may occur unless the pure hydrogen partial pressure on one side of the membrane is kept sufficiently low. It can therefore be seen that there exists a need for an inexpensive membrane for the diffusion of hydrogen and more particularly for membrane systems which tend to prevent back diffusion of the hydrogen on variation of the pressure gradient across the membrane.

It is therefore an object of our invention to fractionate hydrogen and its isotopes from gaseous mixtures and to purify hydrogen by employing a novel membrane system. Another object of our invention is to provide a means of recovering hydrogen by diffusion from a feed stream containing hydrogen which stream may vary widely in the partial pressure of hydrogen without significant back diffusion occurring through the membrane. A further object of our invention is to provide novel multi-layer membrane systems which are economic in cost, and which are substantially irreversible to the back diffusion of hydrogen. Other objects and advantages of our invention will be apparent to those persons skilled in the art from the following more detailed description of our invention.

We have discovered a novel membrane which comprises a first layer of material which catalyzes the chemisorptive dissociation of the hydrogen molecule to hydrogen atoms (proton, deuterium, or tritium) on a second base layer of a solid non-porous, substantially non-catalytic material in which the hydrogen atoms have a high solubility and/or a good permeability rate. This construction provides a membrane which has a substantially reduced tendency, if any, to permit the back diffusion of hydrogen. Not only may back diffusion of hydrogen be prevented by our membrane, but also the cost of the membrane to diffuse hydrogen may be reduced by employing less expensive material as the base layer and by the use of very thin films of catalytic material.

The diffusion of the hydrogen atom through a thin film of catalytic material is distinguished from the separation of gases by porous flow through an atomic lattice structure or a mechanical barrier of particular pore size. The thin film or first layer surface of our membrane composed of a catalytic material is placed in contact with the pressurized hydrogen to be purified or the gaseous mixture to be fractionated. This first layer must comprise a material which catalyzes the rapid chemisorptive dissociation of the hydrogen molecule into hydrogen atoms. Particularly suitable materials for this purpose include, but are not limited to, metals such as nickel, palladium, platinum, tungsten, molybdenum, iron and certain alloys thereof, such as palladium-silver alloys which metals or alloys act usually at elevated temperatures as semi-permeable membranes for the diffusion of hydrogen. The first layer must provide for the rapid dissociation of the hydrogen preferably without reaction with the atmosphere which might degrade its dissociative properties, and therefore noble non-reactive metals like palladium and palladium-silver are particularly preferred as the first layer material. The hydrogen molecule on being adsorbed on the metallic surface is quickly dissociated into hydrogen ions or atoms which readily diffuse through the metal film by virtue of the driving force of the pressure gradient. These first metal continuous films may be formed by vacuum deposition of the particular metal, electroplating, coating, rolling, chemical deposition or chemical reaction or other film-forming means. To permit rapid dissociation of the hydrogen molecule, these films normally must be heated to an elevated temperature sufficient to accomplish the rapid catalytic dissociation of the hydrogen. Temperatures commonly employed with palladium and palladium-silver alloys for this purpose range from about 300 to 1000° C.

The base or second layer on which the thin catalytic first layer is coated on or placed comprises a material having an internal atomic latice structure such that the hydrogen atoms or ions, deuterium or tritium have a high solubility and diffusivity, but which material is non-porous substantially non-catalytic for dissociation and substantially impermeable to the hydrogen molecule. For example, most continuous solid metal and metal alloy films or sheets have an atomic latice structure sufficient to prevent the passage of hydrogen molecules, but have good solubilities for the dissociated hydrogen atoms. Where the base layer is employed as a relatively thin film, such as from 0.0001 to 0.01 inch in thickness, the more non-reactive common noble metals like gold, silver and the like, may be employed. However, where greater structural strength or less expensive material is desirable, the inexpensive metals such as steel, stainless steel, iron, nickel and the like may be employed. The materials selected should not catalyze the dissociative chemisorption at any appreciable rate of the hydrogen molecules since this would tend to permit a greater degree of back diffusion than may be desired. For example, a thin layer of gold will not catalyze the dissociation of the hydrogen atoms passing therethrough, but the dissociated hydrogen atoms from the catalytic membrane will re-combine at the gas-gold surface into hydrogen molecules at atmospheric pressure. The recombined hydrogen molecules are prevented from further significant dissociation and back diffusion across the gold-palladium interface, in any appreciable amount. Except as otherwise disclosed the base material must also not be appreciably soluble to the re-combined hydrogen molecule or be fabricated of a hydrogen-porous material which would permit the re-combined hydrogen molecule to pass easily through the base material and again into direct contact with the catalytic first film layer. Thus, hydrogen-porous sintered metals and porous ceramic materials cannot be employed as the base or second layer of our membrane.

Where the base material is a metal, the material aids in permitting the dissociative hydrogen atoms to re-combine rapidly at the metal-gas innerface. Although metals have been described in particular as a suitable base material, other materials, such as polymers, and even silica type and borosilicate type glass, such as described in U.S. Patent No. 3,019,853, may be employed. This glass permits the passage of hydrogen molecules through the atomic structure unlike solid metal films, but the diffusivity of the hydrogen molecule is considerably less and appreciably slower than the diffusivity of the smaller dissociated hydrogen atoms. If desired our membranes may be coated as thin films, one on top of the other, on a supporting material which is porous to the hydrogen molecule.

In a further embodiment of our invention, an improved multi-layer membrane may be fabricated by separating the first layer which effects the rapid dissociation of the hydrogen molecule from the second layer by a porous insulating material of high solubility, even to the hydrogen molecule. For example, a thin film of a catalytic material may be deposited on the one surface of a gas-porous material including glass, ceramics or refractory material, or porous polymers such as polyolefins like polyethylene polyesters like Mylar, thermosetting resins like phenolic resins, and fluorocarbon resins like Teflon, which materials are sufficiently heat-resistant at the elevated temperatures to which the catalytic film must be raised to provide the required rapid dissociation required for the system. The opposite side of the porous material may then be coated with a thin film of metal which serves as the base material. In this manner, membranes of substantial thickness may be formed, having greater bulk and providing increased strength, but retaining many of the functional advantages of our previously-described membranes. Membranes of this type are particularly useful wherein the non-metallic porous materials serve both as heat insulators and as a porous material for the passage of the hydrogen atoms from the palladium surface. The materials are preferably non-metallic to inhibit the re-combination of the hydrogen molecule within the insulating layer.

This arrangement is desirable where a temperature gradient exists or is created across the catalytic-metal innerface, that is, where an elevated temperature is maintained at the catalytic surface to promote rapid dissociation of the hydrogen molecule and a lower temperature maintained by the thermal insulating layer at the base metal surface to reduce catalytic dissociation. In this application the base metal may also include the catalytic metals and alloys even palladium, since these metals will be at a much lower temperature such that the rate of dissociation and back diffusion will be considerable less than the higher temperature surface. The base metal surface in addition to preventing back diffusion aids in permitting the hydrogen atoms passing through the porous materials and through the base metal to re-combine on the metallic surface. Hydrogen atoms tend to combine into hydrogen molecules, however, in the presence of most metal such re-combination occurs far more readily. One inexpensive type of porous insulating material could comprise silica and borosilicate type glass, vacuum plated on one side with a thin film of a catalytic material such as palladium and on the opposite side with a noble metal like gold or a relatively inexpensive metal like nickel. Where a porous material is employed as the intermediate layer relatively thin layers e.g. ½ to 10 mils should be employed since the greater the thickness or path length through which the hydrogen atoms must traverse, a greater degree of re-combination will occur reducing the rate of hydrogen permeation. Our membranes are relatively inexpensive and prevent or substantially reduce the back diffusion of dissociated hydrogen when the pressure gradient across the membrane varies. Typical membranes may be prepared as follows:

*Example 1*

An improved membrane is prepared by plating a thin continuous film of about 0.005 inch thickness of nickel on a palladium thimble. The palladium thimble is then heated to a temperature of about 500° C. and hydrogen under pressure of 100–200 p.s.i.g. introduced into the interior of the thimble. The hydrogen will diffuse through the palladium thimble and the nickel surface and form pure hydrogen at atmospheric pressure on the exterior surface of the thimble. When the hydrogen within the thimble is evacuated there will be observed little, if any, decrease in hydrogen pressure on the nickel side or exterior of the thimble, indicating that the thin base metal layer of nickel has prevented the re-combined hydrogen molecule on the exterior from further dissociation and passing appreciable amounts into the low pressure within the thimble.

*Example 2*

An improved membrane is prepared by vacuum depositing a thin film of about 0.001 inch of gold on a thin sheet of about 0.002 inch of a palladium 30% silver alloy. As in Example 1, the hydrogen at an elevated pressure will diffuse through the palladium-silver side to the gold side, but when the hydrogen within the thimble is evacuated no decrease in hydrogen pressure on the gold side is observed.

*Example 3*

An improved membrane is prepared by vacuum plating to a thickness of about 0.0006 inch a palladium film on the surface of a stainless steel 304 sheet. This membrane upon being heated to an elevated temperature of about 450° C. will permit the passage of hydrogen from a gaseous mixture of for example 35% hydrogen and 65% nitrogen to pass from the palladium side to the iron surface. When the partial pressure of the hydrogen on the palladium side is decreased below that of the pressure on the iron side, no back diffusion of the pure hydrogen will be observed.

*Example 4*

The surface of a glass sheet composed of at least 75% silica or of borosilicate glass of a similar type containing from about 2 to 15% $B_2O_3$ is coated by vacuum deposition with a first thin continuous film layer of a gold film of about 1 mil in thickness. A second thin film of palladium is vacuum deposited over the gold film at about the same thickness. This multilayer membrane at elevated temperatures will permit the diffusion of hydrogen across the palladium-gold-glass interface but inhibit back diffusion when the hydrogen partial pressure on the palladium side falls below atmospheric pressure.

*Example 5*

An improved membrane is prepared by vacuum depositing a thin continuous layer of aluminum on a 1 mil Mylar polyester-type sheet and vacuum depositing over the aluminized Mylar a thin layer of a catalytic metal such as palladium. The membrane so prepared permits the diffusion at elevated temperatures from the outer surface of the palladium to the polyester inner surface of hydrogen atoms, but prevents substantial back-diffusion of the hydrogen when the impure hydrogen pressure on the palladium side is removed.

*Example 6*

A Mylar polyester film having a thickness of about 2 mils is vacuum deposited with a catalytic metal such as palladium or platinum at a thickness of about 0.001 inch. The opposite side of the Mylar film is then coated by vacuum deposition with a thin film of aluminum. The membrane so prepared on being heated to elevated temperatures permits the diffusion there through of hydrogen and substantially reduces the back-diffusion of recombined hydrogen from the aluminum surface, while the aluminum surface aids in the recombination of the hydrogen atoms diffused by the heated palladium film.

*Example 7*

A process of fractionating hydrogen from a gaseous mixture containing hydrogen, nitrogen and oxygen is accomplished by employing the membrane of Example 6 and heating the palladium film on the one side of the membrane to a temperature of about 500° C. while maintaining the thin film of aluminum on the opposite side of the diffusion cell at a temperature lower than that of the palladium, for example, 100°–200° C. Our membrane, together with the temperature gradient across the membrane, will significantly prevent the back diffusion of hydrogen when the hydrogen pressure is removed or reduced on the palladium side of the diffusion cell membrane.

*Example 8*

An improved membrane is prepared by the coating of a borosilicate-type glass sheet with a thin film e.g. 0.0006 inch of palladium-silver alloy on the one surface. This membrane upon being heated to an elevated temperature e.g. 500° C. permits the platinum to rapidly dissociate hydrogen molecules at an elevated pressure of 150 p.s.i.g. into hydrogen atoms and the hydrogen atoms to pass there through and through the atomic latices structure of the borosilicate glass. The dissociated hydrogen atoms recombine into hydrogen molecules at the glass-gas interface and are recovered as substantially pure hydrogen at atmospheric pressure. Reduction or removal of the hydrogen partial pressure on the palladium surface with a higher pressure on the glass surface does not result in any appreciable back diffusion of the hydrogen.

Our membrane as described may be employed in a variety of structural forms such as in sheets or tubes and as small hollow particles and the like. Most commonly, membranes are employed in the diffusion cell in sheet or tube form. A typical hydrogen diffusion cell comprises an enclosed gas chamber, and means usually at the one end of the chamber for introducing and containing in the chamber a feed gas containing hydrogen under pressure, for example, 100–300 p.s.i.g., and for placing the hydrogen containing gas into contact with the catalytic metal surface of a plurality of membrane sheets or tubes within the chamber. Additionally, a diffusion cell would contain means such as an electrical heating circuit for resistance heating of the catalytic metal membrane surface to the desired temperature and means in fluid flow communication with the opposite or base surface of my membrane to withdraw and remove pure recombined hydrogen which has passed through the catalytic membrane film and to remove the pure hydrogen so recovered from the gas chamber. The gas chamber would also include a plurality of stacked membrane sheets or tubes within the chamber, and means usually at the other end of the chamber to withdraw the hydrogen-poor feed stream from the gas chamber. Typical diffusion cells are further described in U.S. Patents 2,958,391; 2,961,062 and 3,019,853. In a gas diffusion cell apparatus, impure hydrogen or a gaseous mixture containing hydrogen is maintained under elevated pressure in contact with the catalytic metal surface. This metal surface or even the gas stream is heated to an elevated temperature. The pure hydrogen diffusing through the membrane is removed from the opposite side of the membrane so that a pressure gradient will exist across the membrane surface.

Our membranes have been described in particular in the fractionation and purification of hydrogen but these improved membranes may also be usefully employed in fuel cells as a membrane separator sheet between anode and cathode compartments, to purify hydrogen in a feed stream going to or from a fuel cell compartment where conductive metals are used or even as the anode or cathode of a fuel cell. The hydrogen feed streams employed with our membranes may be obtained from a variety of sources such as from the reaction of steam with carbon or iron, from petro-chemical processes such as the refining, cracking, decomposition or dehydrogenation processes employing petroleum or petroleum gases, the electrolysis of aqueous solutions, the fractionating of hydrogen-containing gases, the reaction of acids on metal, the dissociation of ammonia over a catalyst at high temperatures and the like. Where ultrapure hydrogen is desired to be recovered, suitable techniques and steps should be taken to remove contaminating gases from the hydrogen stream prior to contacting the catalytic surface of our membranes. For example, hydrogen-sulfides and other sulphur compounds, mercury and other unsaturated hydrocarbons as well as hydrogen chloride and chlorene in the presence of iron are normally harmful to the palladium surface.

Our invention permits the preparation and fabrication of improved membranes for the separation of hydrogen by diffusion. Our membranes permit the separation of hydrogen without substantial back diffusion, are simple and less expensive than conventional thick membrane films, and our membranes permit the imposition of temperature gradients across the membrane interface.

What we claim is:

1. A membrane for the separation of hydrogen by diffusion and to prevent back diffusion of hydrogen which membrane comprises: a first layer of a material which catalyzes the dissociation of hydrogen molecules into hydrogen atoms and permits the passage of the hydrogen atoms therethrough; and a second layer comprising a material selected from the group consisting of gold, silver, aluminum, high silica-type glass, and polymers, which material has a high solubility for hydrogen atoms and is substantially impervious and insoluble to the passage of hydrogen molecules therethrough whereby hydrogen molecules dissociated on the face of the first layer, pass through the first and second layers as hydrogen atoms, and the recombined hydrogen molecules after such passage are prevented from back diffusing through the second layer.

2. The membrane of claim 1 wherein the first layer is a thin film of a palladium-containing metal.

3. The membrane of claim 1 wherein the second layer is a borosilicate glass substantially impervious to the passage of the hydrogen molecules at temperatures of less than about 500° C.

4. The membrane of claim 1 wherein the first and second layers are bonded to and separated by a heat resistant material porous to the passage of hydrogen molecules and atoms.

5. The membrane of claim 1 wherein the first layer is a thin film of a catalytic metal bonded to the second layer, the second layer is a thin film of metal, and is bonded to a porous supporting material.

6. The membrane of claim 5 wherein the supporting material is a flexible polymeric film.

7. The membrane of claim 5 wherein the supporting material is glass.

8. The membrane of claim 5 wherein the first layer includes a thin continuous film of a palladium-containing metal.

9. A hydrogen diffusion cell which includes a plurality of tubes for the separation of hydrogen, the tubes formed from the membrane of claim 1.

10. A method for separating hydrogen by diffusion from gaseous mixtures and for preventing the back diffusion of the separated hydrogen mixture which method comprises:

providing a diffusion cell having a semi-permeable membrane comprising a first layer of a metal which catalyzes the dissociation of the hydrogen molecule into hydrogen atoms and permits the passage of the hydrogen atoms therethrough and a second layer of a material which has a high solubility for the hydrogen atoms so diffused through the first layer, but which is substantially impervious and insoluble to the passage of hydrogen molecules;

heating the first layer to an elevated temperature sufficient to provide for the rapid dissociation of the hydrogen molecule;

contacting the first layer with a hydrogen-containing gas stream at an elevated pressure which stream is subject to variations in the partial pressure of the hydrogen therein;

withdrawing diffused hydrogen at a reduced pressure from the down stream side of the second layer; and withdrawing the non-diffused component from the upstream side of the first layer whereby the second layer prevents back diffusion of the hydrogen molecule when the hydrogen pressure of the gas stream falls below the pressure of the hydrogen on the downstream side of the second layer.

11. The method of claim 10 wherein the first and second layers are bonded to opposite sides of and separated by a layer of porous heat-resistant material.

12. The method of claim 11 which includes maintaining a temperature gradient across the membrane such that the first layer is maintained at a high temperature and the second layer is maintained at a lower temperature.

13. The method of claim 10 wherein the second layer is a material selected from the group consisting of gold, silver, aluminum, glass and a polymer.

14. The method of claim 10 wherein the first layer is a palladium-containing metal and the second layer is a layer of metal.

15. A method of preventing the back diffusion of hydrogen separated from a gaseous mixture which method comprises:

providing a hydrogen diffusion cell having a multi-layer semi-permeable membrane which includes a first layer of a material which catalyzes the dissociation of the hydrogen molecule into hydrogen atoms and permits the passage of hydrogen atoms therethough, and a second layer which has a high solubility for hydrogen atoms but which is substantially impervious and insoluble to the passage of the hydrogen molecule, the first and second layers bonded to and separated by a heat insulating layer;

heating the first layer to a temperature sufficient to permit the rapid dissociation of the hydrogen-molecule and maintaining the second layer at a lower temperature so that the material of the second layer will have a lower dissociation rate for hydrogen molecule than the first layer thereby creating a temperature gradient across the membrane;

contacting the first layer of the membrane with a hydrogen containing gas mixture at an elevated pressure and permitting hydrogen to diffuse therethrough;

withdrawing hydrogen so diffused at a reduced pressure from the downstream side of the second layer of the membrane; and withdrawing the non-diffused components of the gas mixture from the upstream side of the first layer of the membrane.

16. The method of claim 15 wherein the first and second layers are the same metals.

17. The method of claim 15 wherein the first and second layers are different metals.

18. The method of claim 15 wherein the first layer is a palladium-containing metal.

References Cited

UNITED STATES PATENTS

| | | | |
|---|---|---|---|
| 2,824,620 | 2/1958 | De Rosset | 55—16 |
| 2,921,210 | 1/1960 | Schaschl et al. | 55—16 |
| 3,019,853 | 2/1962 | Kohman et al. | 55—158 X |
| 3,148,031 | 9/1964 | Vahldieck et al. | 55—16 X |

REUBEN FRIEDMAN, *Primary Examiner.*

J. ADEE, *Assistant Examiner.*